Patented Apr. 1, 1952

2,591,506

UNITED STATES PATENT OFFICE 2,591,506

2-VINYL-THIAZOLE

Lester A. Brooks, East Norwalk, Conn., and Moushy Markarian, North Adams, and Mathew Nazzewski, Adams, Mass., assignors to Sprague Electric Company, North Adams, Mass., a corporation of Massachusetts No Drawing. Application September 11, 1948, Serial No. 48,925

2 Claims. (Cl. 260—302)

This invention relates to new thiazole compounds and more particularly refers to polymerizable vinyl thiazoles.

This application is a continuation-in-part of our U. S. patent application bearing Serial Number 559,460, filed on October 19, 1944, now U. S. Patent 2,522,501.

It is an object of the invention to produce new and useful thiazole compounds. An additional object is the preparation of polymerizable vinyl thiazole compounds.

The invention is concerned with compounds conforming to the general formula:

$$Z-\underset{R}{\overset{|}{C}}=CH_2$$

wherein Z represents a thiazole ring which may be further substituted, and R a radical selected from the class consisting of hydrogen and alkyl radicals. More particularly, the invention is concerned with 2-vinyl thiazoles, 4-vinyl thiazoles and 5-vinyl thiazoles.

The preferred compounds of the invention are the 2-vinyl thiazoles. These are readily prepared by dehydrating the corresponding 2-hydroxyethyl thiazoles, by pyrolyzing the condensation product of an alpha-benzoxythiopropionamide with an alpha-chloro ketone or aldehyde, and by dehydrohalogenating the corresponding 2-chloro- or 2-bromo-ethyl thiazoles.

The first synthesis may be pictured as follows:

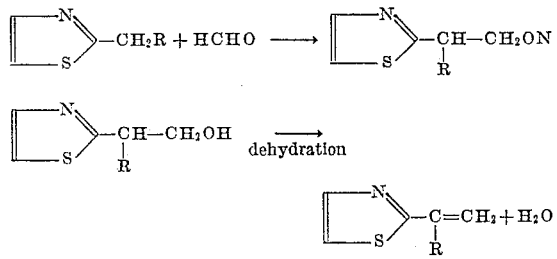

wherein R may be hydrogen or the methyl radical.

The second synthesis may be represented as follows:

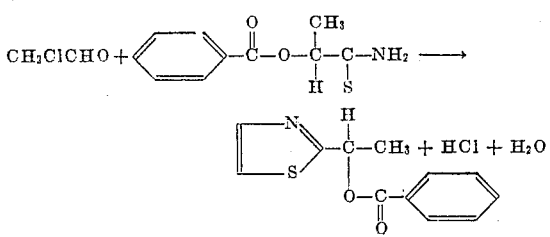

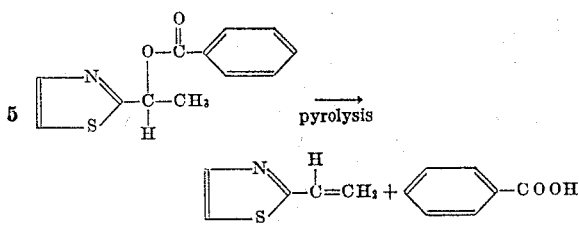

In the above synthesis, the hydrogen on the ketonic carbon of the aldehyde may be substituted by an alkyl radical, and a hydrogen on the alpha carbon of the aldehyde may be replaced by a hydrocarbon radical. Likewise, the hydrogen on the alpha carbon of the amide may be substituted with a methyl radical.

Furthermore, the vinyl compounds may be prepared by dehydrohalogenating the corresponding alpha- and beta-bromo- or alpha- and beta-chloro-ethyl thiazole intermediate. The dehydrohalogenation may be accomplished by pyrolysis, or by refluxing with an alkali metal alcoholate. The reaction proceeds as follows

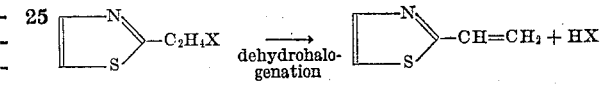

The pyrolysis may be carried out at temperatures between about 200° C. and about 600° C. Catalysts for the reaction are numerous, alumina and heated boro-silicate glass being effective. The dehydration employed in the first synthesis may be carried out between about 100° C. and about 600° C. Suitable catalysts are alumina, potassium acid sulfate, and the like.

The compounds of the invention are generally liquids which are soluble in a number of the ordinary solvents, for example, in aromatic hydrocarbons, chlorinated aliphatic hydrocarbons, alcohol, acetone and in water solutions of the mineral acids. Polymerization inhibitors should be added to the monomers for storage stability. Morpholine, p-tert-butyl catechol and the like are satisfactory for this purpose. Storage should be conducted in the absence of light.

The compounds listed below are representative of my new vinyl thiazole compounds, and they may be produced by one or more of the foregoing syntheses:

2-vinyl thiazole
2-vinyl benzothiazole
2-(alpha-methyl vinyl) thiazole
4-ethyl-2-vinyl thiazole
4-propyl-2-vinyl thiazole 4,5-dimethyl-2-vinyl thiazole
4-phenyl-2-vinyl thiazole
4-methyl-2-vinylbenzothiazole
5-methyl-2-vinyl thiazole
5-chloro-2-vinyl thiazole The examples given below illustrate the preparation of the monomeric vinyl thiazole compounds of the invention:

EXAMPLE 1

*Preparation of 2-vinyl thiazole*

50 gms. of alpha-benzoxythiopropionamide and 41 gms. of the monohydrate of chloroacetaldehyde were refluxed in 200 cc. of benzene for 2 hours. The solution was poured into water and neutralized with alkali. The benzene extract was dried over magnesium sulfate and then distilled to give about 20 gms. of 2-(alpha-benzoxyethyl)-thiazole, an oily liquid with a boiling point of about 135–139° C./1.5 mm.

This liquid was bled with nitrogen into the top of a vertical pyrolysis tube containing activated alumina and held at about 460° C. The product was collected in a flask cooled externally with a Dry-Ice-acetone mixture. The crude product was washed with an aqueous caustic solution and then distilled under reduced pressure to give the desired 2-vinyl thiazole, B. P. 43–46° C./10 mm., $N_D^{30}$ 1.5435. The yield was about 40%.

EXAMPLE 2

*Preparation of 4-phenyl-2-vinylthiazole*

2-(alpha-benzoxyethyl)-4-phenyl thiazole, prepared as described by Olin and Johnson (J. A. C. S. 53, 1473–5 (1931)) was pyrolyzed, as in Example 1, the temperature of the pyrolysis tube being maintained at 450° C. The crude product was alkali washed and distilled to give 4-phenyl-2-vinyl thiazole, a liquid, B. P. 96–103° C./1.5 mm.

EXAMPLE 3

*Preparation of 2-vinyl benzothiazole*

100 gms. of 2-methylbenzothiazole were condensed by heating with 150 cc. of a 26% aqueous solution of formaldehyde and 150 cc. of water for 24 hours on a steam bath. The unreacted material was steam-distilled off. The product residue was dissolved in dilute HCl and extracted with ether. After neutralizing with aqueous NaOH, the product was extracted with chloroform. The later was removed by water pump vacuum at room temperature. A yield of 55% of 2-(betahydroxyethyl)-benzo thiazole was thus obtained.

This intermediate was dehydrated, as described in the pyrolysis of Example 1, at a temperature of about 480° C. The crude vinyl compound, collected in the cold flask, was dried over magnesium sulfate and distilled. The resultant 2-vinyl-benzothiazole distilled at 68–73° C./0.8 mm. and had a refractive index $N_D^{27}$ 1.6168.

EXAMPLE 4

*Preparation of 4-methyl-2-vinyl thiazole*

A solution of 100 gms. of alpha-benzoxythiopropionamide and 40 gms. of chloroacetone in 200 cc. of benzene was refluxed for four hours. The initial period of reaction was quite exothermic. The solution was neutralized with aqueous NaOH, and the benzene layer removed and dried over magnesium sulfate. The benzene was removed by water pump vacuum, and the residue distilled under reduced pressure, giving 71 gms. of the desired 2-(alpha-benzoxyethyl)-4-methyl thiazole, an oily liquid, B. P. 144–149° C./3 mm., $N_D^{26}$ 1.5569.

The intermediate produced above was pyrolyzed, as described in Example 1, at 510° C. to give a reddish crude product. The latter was extracted with ether, washed with aqueous NaOH, and the ether was then removed by water pump vacuum. The residual liquid was fractionally distilled to give a 38% yield of 4-methyl 2-vinyl thiazole, B. P. 51–54° C./8 mm., $N_D^{30}$ 1.5442.

EXAMPLE 5

*Preparation of 4-methyl-2-(alpha-methylvinyl) thiazole*

4-methyl-2-(alpha-benzoxy-alpha-methylethyl)-thiazole, was produced by condensing 100 gms. of alpha-benzoxy-alpha-methylthiopropionamide with 45 gms. of chloroacetone in a benzene solution, following the procedure described in Example 4. As a by-product during the distillation fore-run, a small amount of the desired vinyl compound was obtained. The thiazole intermediate was pyrolyzed by the procedure given in Example 1 at a temperature of about 480–485° C. The crude product was worked up by solution in toluene, extracted with aqueous NaOH and distilled to give a fair yield of the desired 4-methyl-2(alpha-methylvinyl)-thiazole, B. P. 40–42° C./0.8 mm., $N_D^{28}$ 1.5373.

The compounds of the invention may be employed in homo- and copolymerization systems, and as intermediates in the synthesis of dyestuffs, pharmaceuticals, fine chemicals, etc.

As many apparently widely different embodiments of this invention may be made without departing from the spirit and scope hereof, it is to be understood that the invention is not limited to the specific embodiments hereof, except as defined in the appended claims.

We claim:
1. A 2-vinyl thiazole.
2. 2-vinyl thiazole.

LESTER A. BROOKS.
MOUSHY MARKARIAN.
MATHEW NAZZEWSKI.

REFERENCES CITED

The following references are of record in the file of this patent:

Chemical Abs., vol. 32, p. 7577, citing Livoff et al., Compt. rend. 128, pp. 238–241.